United States Patent [19]
Baumann et al.

[11] 3,755,353
[45] Aug. 28, 1973

[54] BASIC DYES OF THE NAPHTHOLACTAM SERIES

[75] Inventors: Hans Baumann, Ludwigshafen; Andreas Einwiller, Mannheim, both of Germany

[73] Assignee: Badische Anilin- & Soda-Fabrik Aktiengesellschaft, Ludwigshafen/Rhine, Germany

[22] Filed: July 8, 1971

[21] Appl. No.: 160,908

[52] U.S. Cl..... 260/326.3, 260/247.2 B, 260/247.1, 260/293.61, 260/310 D, 260/41, 8/7, 8/12, 8/55, 106/22
[51] Int. Cl............................................. C07d 27/72
[58] Field of Search..................... 260/326.3, 310 D, 260/247.2 B, 293.61

[56] References Cited
UNITED STATES PATENTS
3,649,645  3/1972  Yamada et al................. 260/326.62

*Primary Examiner*—Joseph A. Narcavage
*Attorney*—Johnston, Root, O'Keefe, Keil, Thompson & Shurtleff

[57] ABSTRACT

Basic dyes of the naphtholactam series derived from an N-alkoxycarbonylethyl naphtholactam and an N-substituted aniline. They dye anionically modified textile material such as polyesters or acrylonitrile polymers blue shades.

4 Claims, No Drawings

BASIC DYES OF THE NAPHTHOLACTAM SERIES

The invention relates to basic dyes having the general formula (I):

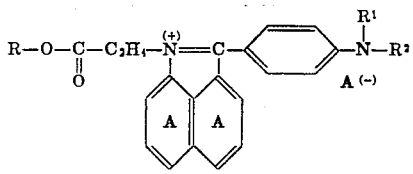

(I)

where
R denotes unsubstituted or substituted alkyl;
R¹ denotes unsubstituted or substituted alkyl, aralkyl or aryl;
R² denotes hydrogen or unsubstituted or substituted alkyl;
R¹ and R² together with the nitrogen atom denote the radical of a heterocyclic ring; and
$A^{(-)}$ denotes an anion and
where the ring of the naphthalene may bear, as substituents, chlorine or bromine or unsubstituted or substituted sulfonamido.

Specific examples of R are: methyl, ethyl, propyl, isopropyl, butyl, isobutyl, t-butyl, β-chloroethyl, β-hydroxyethyl, β-hydroxypropyl, δ-hydroxybutyl and 2-hydroxy-3-chloropropyl.

Examples of substituents R¹ are: methyl, ethyl, propyl, butyl, β-hydroxyethyl, βacetoxyethyl, β-cyanoethyl, β-chloroethyl, benzyl, phenylethyl, phenyl, ethoxyphenyl, and methoxyphenyl.

Examples of R² are: methyl, ethyl, propyl, butyl, β-hydroxyethyl and β-cyanoethyl.

Anions $A^{(-)}$ may be simple or complex and are derived from inorganic or organic acids. Specific examples include chloride, bromide, sulfate, nitrate, methosulfate, ethosulfate, benezenesulfonate, toluenesulfonate, formate, acetate, tetrafluoborate, and particularly tetrachlorozincate.

Particular industrial importance attaches to dyes having the general formula (Ia):

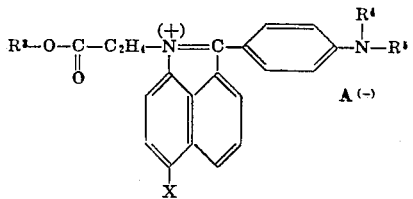

(Ia)

where
R³ denotes alkyl having one to four carbon atoms;
R⁴ denotes alkyl having one to four carbon atoms, β-hydroxyethyl, β-cyanoethyl, β-chloroethyl, benzyl, β-phenylethyl, phenyl or ethoxyphenyl;
R⁵ denotes alkyl having one to four carbon atoms, β-hydroxyethyl, β-cyanoethyl or β-chloroethyl or hydrogen: and
X denotes hydrogen, chlorine, bromine or N,N-disubstituted sulfonamido; and
$A^{(-)}$ denotes an anion.

Examples of substituted sulfonamido groups for X are: N,N-dimethylsulfonamide, N,N-diethylsulfonamide, N,N-dibutylsulfonamide, sulfonic acid morpholide, piperidide or pyrrolidide, N-methyl-N-β-hydroxyethylsulfonamide, N-ethyl-N-β-hydroxyethylsulfonamide, N-butyl-N-β-hydroxyethylsulfonamide and N,N-di-β-hydroxyethylsulfonamide.

The dyes having the formula (I) may be prepared by reaction of a naphtholactam having the general formula (II):

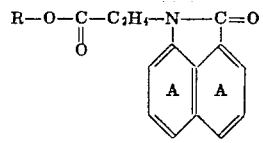

(II)

with an amine having the general formula (III):

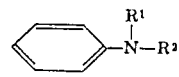

(III)

in the presence of a water-eliminating condensing agent. R, R¹ and R² have the meanings given above and the rings A may bear the specified substituents.

Examples of water-eliminating condensing agents are: $PCl_3$, $PCl_5$, $POCl_3$, $POBr_3$, $SOCl_2$, $SO_2Cl_2$, $AlCl_3$, $ZnCl_2$, $BF_3$ and mixtures of these compounds. The reaction may be carried out with or without a solvent. If desired inert solvents may be added such as hydrocarbons or chlorohydrocarbons, for example benzene, toluene, xylene, chlorobenzene, dichlorobenzene, trichlorobenzene, chloroform, ethylene chloride and 1,2-dichloropropane.

Examples of components having the formula (II) are:
N-β-carbomethoxyethylnaphtholactam, N-β-carboethoxyethylnaphtholactam, N-β-carboisopropoxyethylnaphtholactam. N-β-carbobutoxyethylnaphtholactam, N-β-carboisobutoxyethylnaphtholactam, N-β-carbomethoxyethyl-4-chloronaphtholactam,
N-β-carbomethoxyethylnaphtholactam,
N-β-carboethoxyethylnaphtholactam,
N-β-carboisopropoxyethylnaphtholactam,
N-β-carbobutoxyethylnaphtholactam,
N-β-carboisobutoxyethylnaphtholactam,
N-β-carbomethoxyethyl-4-chloronaphtholactam,
N-β-carbomethoxyethyl-4-bromonaphtholactam,
N-β-carbomethoxyethyl-4-dimethylsulfonamidonaphtholactam,
N-β-carbomethoxyethyl-4-diethylsulfonamidonaphtholactam,
N-β-carbomethoxyethyl-4-sulfopiperididonaphtholactam,
N-β-carbomethoxyethyl-4-sulfomorpholidonaphtholactam,
N-β-carboxymethoxyethyl-4-sulfopyrrolididonaphtholactam,
N-β-carboethoxyethyl-4-chloronaphtholactam,
N-β-carboethoxyethyl-4-bromonaphtholactam,
N-β-carboethoxyethyl-4-dimethylsulfonamidonaphtholactam,
N-β-carboethoxyethyl-4-diethylsulfonamidonaphtholactam,
N-β-carboethoxyethyl-4-sulfopiperididonaphtholactam,
N-β-carbobutoxyethyl-4-sulfomorpholidonaphtholactam,
N-β-carbobutoxyethyl-4-sulfopyrrolididonaphtholactam, N-β-carbobutoxyethyl-4-chloronaphtholactam,
N-β-carbobutoxyethyl-4-bromonaphtholactam,
N-β-carbobutoxyethyl-4-dimethylsulfonamidonaphtholactam,
N-β-carbobutoxyethyl-4-diethylsulfonamidonaphtholactam,
N-β-carbobutoxyethyl-4-sulfopiperididonaphtholactam,
N-β-carbobutoxyethyl-4-sulfomorpholidonaphtholactam,
N-β-carbobutoxyethyl-4-sulfopyrrolididonaphtholactam,
N-β-carboisobutoxyethyl-4-chloronaphtholactam,
N-β-isobutoxyethyl-4-bromonaphtholactam,
N-β-carboisobutoxyethyl-4-dimethylsulfonamidonaphtholactam,
N-β-carboisobutoxyethyl-4-diethylsulfonamidonaphtholactam,
N-β-carboisobutoxyethyl-4-sulfopiperididionaphtholactam,
N-β-carboisobutoxyethyl-4-sulfomorpholidonaphtholactam,
N-β-carboisobutoxyethyl-4-sulfopyrrolididonaphtholactam, and the compounds having the formulae:

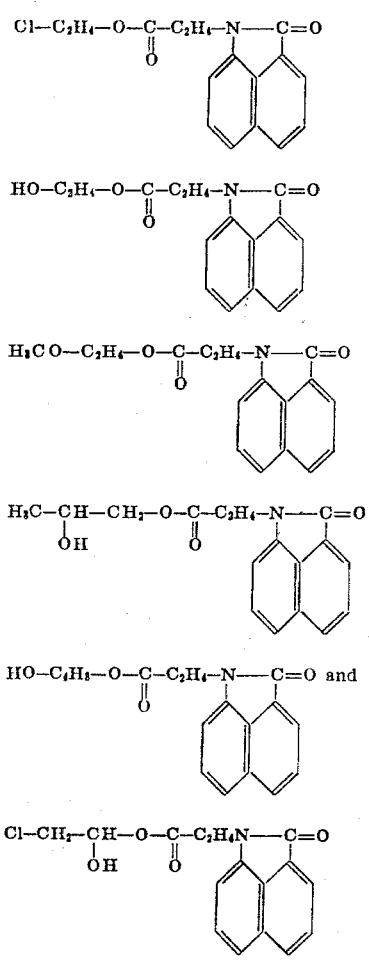

The abovementioned compounds having the formula (II) are obtained by reaction of acrylic esters with naphtholactams or naphtholactam derivatives, preferably in a solvent such as N-methylpyrrolidone, dioxane, dimethylformamide, dimethylsulfoxide or tetramethyleneurea, in the presence of basic condensing agents such as sodium methylate, sodium ethylate, sodium formate, sodium acetate, postassium methylate, potassium ethylate, potassium formate, or potassium acetate.

Examples of components having the formula (III) are: N,N-dialkylanilines, diphenylamine and N-alkyldiphenylamines which may bear alkyl, acylamino or alkoxy radicals as substituents in the aryl radical, and moreover 1-phenylpyrazolones which may bear alkyl and aryl radicals in the 3 and 5 positions, and also N-phenylmorpholine.

The following specific examples are given:
dimethylaniline, diethylaniline, dibutylaniline, N-β-cyanoethyl-N-methylaniline, N-β-cyanoethyl-N-ethylaniline, N-β-cyanoethyl-N-butylaniline, N-β-hydroxyethyl-N-ethylaniline, N,N-di-β-hydroxyethylaniline, N-benzyl-N-ethylaniline, N-β-phenylethyl-N-β-cyanoethylaniline, diphenylamine, N-methyldiphenylamine, N-ethyldiphenylamine, N-methyl-4-ethoxydiphenylamine, 1-phenyl-3-methyl-pyrazoline-Δ-2, 1,3,5-triphenylpyrazoline-Δ-2, 1-phenyl-3,5,5-trimethylpyrazoline-Δ-2 and N-phenylmorpholine.

The dyes having the formula (I) are suitable for dyeing cotton that has been treated with tannic acid, leather, paper, inks, including ball point pen inks, and particularly for dyeing and/or printing anionically modified acrylonitrile polymer or polyester materials or textiles.

The water-soluble blue dyes give light fast and wet fast dyeings on acrylonitrile polymer textile material. The new dyes exhibit a tinctorially valuable bathochromic shift as compared with prior art dyes of this type bearing a methyl or ethyl group on the nitrogen atom of the naphtholactam.

The following Examples illustrate the invention. Statements as to parts and percentages are by weight unless otherwise stated.

EXAMPLE 1

25.5 parts of N-β-carbomethoxyethylnaphtholactam, 8 parts of zinc chloride, 125 parts of ethylene chloride and 45 parts of phosphorus oxychloride are heated to 70°C while stirring. 12.1 parts of dimethylaniline is dripped in at this temperature and the temperature is maintained for 8 hours at 80°C. The whole is poured into water and the solvent is distilled off. After neutralization has been effected with sodium acetate and a solution of common salt has been added, a good yield of the dye having the constitution:

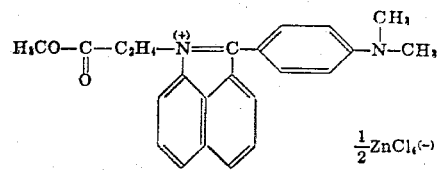

is precipitated. It dyes polyacrylonitrile fibers fast blue shades.

N-β-carbomethoxyethylnaphtholactam can be prepared as follows: 169 parts of naphtholactam is dissolved in 400 parts of dimethylformamide, 95 parts of potassium acetate is added and the solution is then heated to 70°C. 160 parts of methyl acrylate is dripped in at this temperature in the course of 20 minutes and after the addition is completed the temperature is raised to 120°C and the whole is stirred for another 8 hours. The reaction mixture, after it has cooled, is poured into water and the precipitated product is suction filtered and washed with water. The abovementioned compound is obtained in a good yield. The melting point is 108° to 109°C.

EXAMPLE 2

33.4 parts of N-β-carbomethoxyethyl-4-bromonaphtholactam, 7 parts of zinc chloride and 80 parts of phosphorus oxychloride are kept at 70°C for 30 minutes. 15 parts of diethylaniline is then added and the whole is stirred for another 16 hours at 85°C. The reaction mixture is poured onto ice-water and the dye having the formula:

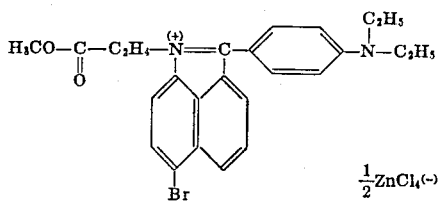

is isolated by a conventional method. It dyes acrylonitrile polymer cloth very fast greenish blue shades.

EXAMPLE 3

A mixture of 26.9 parts of N-β-carboethoxyethyl-naphtholactam, 8 parts of zinc chloride, 75 parts of phosphorus oxychloride and 100 parts of benzene is kept at 60°C for 20 minutes. 15 parts of diethylaniline is then dripped in and the whole is stirred at 80°C for 8 hours. The dye having the constitution:

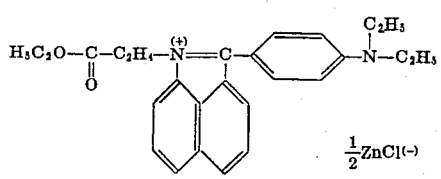

precipitates out from the reaction mixture and can be isolated in a good yield by suction filtration followed by washing with saturated common salt solution. The dye is suitable for dyeing and printing polyacrylonitrile in fast blue shades.

EXAMPLE 4

36.2 parts of N-β-carbomethoxyethylnaphtholactam-4-dimethylsulfonamide, 8 parts of zinc chloride, 50 parts of phosphorus oxychloride and 120 parts of 1,2-dichloropropane are kept at 60°C for 30 minutes. 12.1 parts of dimethylaniline is dripped in, the temperature is raised to 85°C and the whole is stirred for another 8 hours. It is then poured into water and the solvent is distilled off. About 5 parts of activated carbon is added to the mixture and the acid aqueous solution is heated to 80°C and filtered. When the filtrate is neutralized with sodium acetate and common salt solution is added, the dye having the formula:

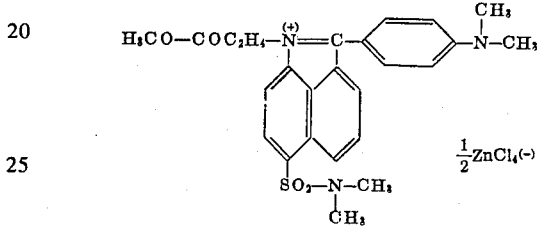

is precipitated. It dyes polyacrylonitrile fibers fast blue shades.

In an analogous manner to that described, dyes having the formula:

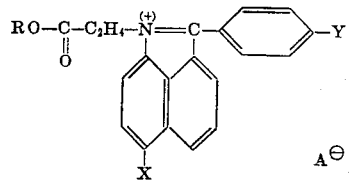

characterized in the following Table by the substituents indicated are obtained.

| Example No. | R | X | Y | Shade of dyeing on polyacrylonitrile |
|---|---|---|---|---|
| 5 | CH₃ | H | N(C₂H₅)(C₂H₅) | Blue. |
| 6 | CH₃ | H | N(C₄H₉)(C₄H₉) | Do. |
| 7 | CH₃ | H | N(CH₃)(C₂H₄CN) | Blue violet. |
| 8 | CH₃ | H | N(C₂H₅)(C₂H₄CN) | Do. |
| 9 | CH₃ | H | N(C₂H₄CN)(C₄H₉) | Do. |
| 10 | CH₃ | H | N(C₂H₄OH)(C₂H₄OH) | Violet. |

| Example No. | R | X | Y | Shade of dyeing on polyacrylonitrile |
|---|---|---|---|---|
| 11 | CH₃ | H | –N(C₂H₅)(C₂H₄OH) | Blue violet. |
| 12 | CH₃ | H | –N(C₂H₅)(CH₂–C₆H₅) | Do. |
| 13 | CH₃ | H | –N(morpholino) | Do. |
| 14 | CH₃ | H | –N(H)(C₆H₅) | Do. |
| 15 | CH₃ | H | –N(CH₃)(C₆H₅) | Do. |
| 16 | CH₃ | H | –N(C₂H₅)(C₆H₅) | Do. |
| 17 | CH₃ | H | –N(CH₃)(C₆H₄–OC₂H₅) | Blue. |
| 18 | CH₃ | H | 3,5,5-trimethylpyrazolinyl | Do. |
| 19 | CH₃ | Br | –N(CH₃)₂ | Do. |
| 20 | CH₃ | Br | –N(C₂H₄CN)(C₂H₅) | Do. |
| 21 | CH₃ | Cl | –N(CH₃)₂ | Do. |
| 22 | CH₃ | Cl | –N(C₂H₅)₂ | Do. |
| 23 | CH₃ | SO₂–N(CH₃)₂ | –N(CH₃)₂ | Do. |
| 24 | CH₃ | Same as above | –N(C₂H₅)₂ | Do. |
| 25 | CH₃ | do | –N(C₂H₅)(C₂H₄CN) | Do. |
| 26 | CH₃ | do | –N(C₄H₉)₂ | Do. |
| 27 | CH₃ | SO₂–N(H)(C₆H₁₁) | –N(CH₃)₂ | Do. |
| 28 | CH₃ | Same as above | –N(C₂H₅)₂ | Do. |

| Example No. | R | X | Y | Shade of dyeing on polyacrylonitrile |
|---|---|---|---|---|
| 29 | $CH_3$ | $SO_2-N\underset{}{\bigcirc}O$ (morpholino) | $-N(CH_3)(C_2H_4CN)$ | Do. |
| 30 | $CH_3$ | Same as above | $-N(C_2H_4CN)_2$ | Do. |
| 31 | $CH_3$ | $SO_2-N\underset{}{\bigcirc}H$ (piperidino-H) | $-N(C_2H_5)_2$ | Do. |
| 32 | $CH_3$ | Same as above | $-N(C_4H_9)(C_2H_4CN)$ | Do. |
| 33 | $C_2H_5$ | H | $-N(CH_3)_2$ | Do. |
| 34 | $C_2H_5$ | H | $-N(C_4H_9)_2$ | Do. |
| 35 | $C_2H_5$ | H | $-N(C_2H_4OH)(C_2H_5)$ | Blue violet. |
| 36 | $C_2H_5$ | H | $-NH-C_6H_5$ | Do. |
| 37 | $C_2H_5$ | Cl | $-N(C_2H_5)_2$ | Blue. |
| 38 | $C_2H_5$ | Cl | $-N(CH_3)(C_2H_4CN)$ | Do. |
| 39 | $C_2H_5$ | $SO_2-N(CH_3)_2$ | $-N(CH_3)_2$ | Do. |
| 40 | $C_2H_5$ | Same as above | $-N(C_2H_4Cl)(C_2H_5)$ | Do. |
| 41 | $n-C_4H_9$ | H | $-N(CH_3)_2$ | Do. |
| 42 | $n-C_4H_9$ | H | $-N(C_2H_5)_2$ | Do. |
| 43 | $n-C_4H_9$ | H | $-N(C_2H_4Cl)(C_2H_5)$ | Blue violet. |
| 44 | $n-C_4H_9$ | H | pyrazoline (3-CH$_3$, 5,5-di-CH$_3$) | Blue. |
| 45 | $n-C_4H_9$ | Cl | $-N(CH_3)_2$ | Do. |

| Example No. | R | X | Y | Shade of dyeing on polyacrylonitrile |
|---|---|---|---|---|
| 46 | n-C₄H₉ | Cl | N(C₂H₅)(CH₂–C₆H₅) | Do. |
| 47 | n-C₄H₉ | Cl | N(C₂H₄–C₆H₅)(C₂H₄CN) | Do. |
| 48 | n-C₄H₉ | SO₂–N(C₂H₅)₂ | N(C₂H₅)₂ | Do. |
| 49 | n-C₄H₉ | Same as above | N(C₂H₄OH)(C₂H₅) | Do. |
| 50 | n-C₄H₉ | ...do... | morpholino | Do. |
| 51 | i-C₄H₉ | H | N(CH₃)₂ | Do. |
| 52 | i-C₃H₇ | H | N(CH₃)(C₂H₄CN) | Blue violet. |
| 53 | i-C₄H₉ | H | N(C₂H₅)₂ | Blue. |
| 54 | i-C₃H₇ | H | N(C₂H₅)(C₂H₄CN) | Blue violet. |
| 55 | i-C₃H₇ | H | N(C₂H₅)₂ | Blue. |

We claim:
1. A basic dye having the formula

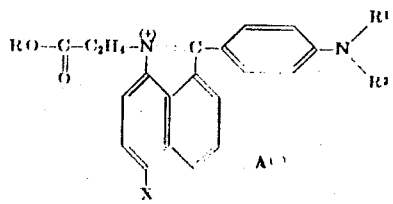

in which
R is alkyl of from one to four carbon atoms, hydroxyalkyl of from two to four carbon atoms, β-chloroethyl or β-hydroxy-γ-chloropropyl,
R¹ is alkyl of from one to four carbon atoms, hydroxyalkyl of from two to three carbon atoms, β-chloroethyl, β-cyanoethyl, benzyl, β-phenylethyl, phenyl, methoxyphenyl or ethoxyphenyl,
R² is hydrogen, alkyl of from one to four carbon atoms, hydroxyalkyl of two or three carbon atoms, β-chloroethyl or β-cyanoethyl,
R¹ and R² together with the nitrogen denote a radical of the formula

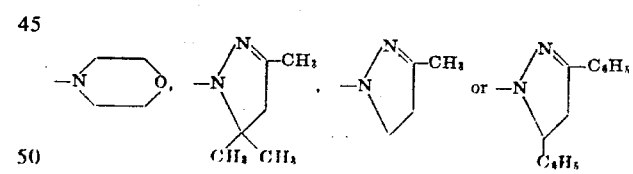

X is hydrogen, chlorine, bromine or a radical of the formula
—SO₂N(CH₃)₂, —SO₂N(C₂H₅)₂, —SO₂N(C₃H₇)₂, —SO₂N(C₄H₉)₂,

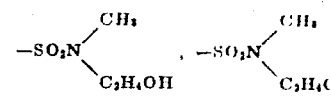

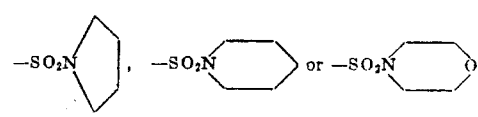

and
A⁽⁻⁾ is an anion represented by chloride, bromide, sulfate, nitrate, methosulfate, ethosulfate, benzenesulfonate, toluenesulfonate, formate, acetate, tetrafluoborate or tetrachlorozincate.

2. A basic dye having the formula

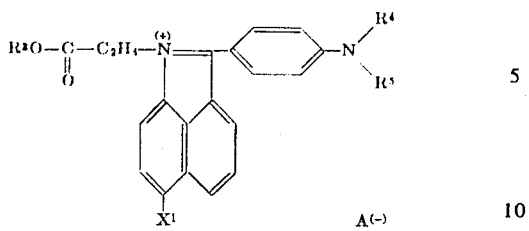

in which
R³ is alkyl of from one to four carbon atoms,
R⁴ is alkyl of from one to four carbon atoms, β-hydroxyethyl, β-chloroethyl, β-cyanoethyl, benzyl, β-phenylethyl, phenyl, methoxyphenyl or ethoxyphenyl,
R⁵ is hydrogen, alkyl of from one to four carbon atoms, β-hydroxyethyl, β-chloroethyl or β-cyanoethyl,
A⁽⁻⁾ is an anion represented by chloride, bromide, sulfate, nitrate, methosulfate, ethosulfate, benzenesulfonate, toluenesulfonate, formate, acetate, tetrafluoborate or tetrachlorozincate and
X¹ is hydrogen or bromine.

3. The dyes having the formula

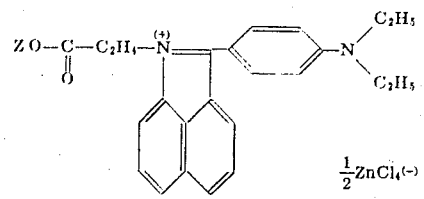

in which Z is methyl or ethyl.

4. The dyes having the formula

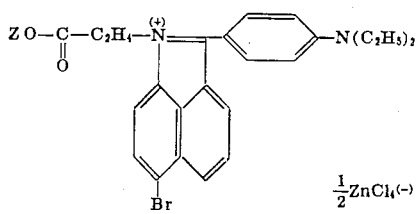

in which Z is methyl or ethyl.

* * * * *

UNITED STATES PATENT OFFICE
CERTIFICATE OF CORRECTION

Patent No. 3,755,353               Dated August 28, 1973

Inventor(s) Hans Baumann and Andreas Einwiller

It is certified that error appears in the above-identified patent and that said Letters Patent are hereby corrected as shown below:

Column 1, line 38, "benezenesulfonate" should read -- benzenesulfonate --.

Column 2, lines 33-38, delete lines 33-38.

Column 4, line 2, "postassium" should read -- potassium --.

Signed and sealed this 8th day of October 1974.

(SEAL)
Attest:

McCOY M. GIBSON JR.                C. MARSHALL DANN
Attesting Officer                  Commissioner of Patents

UNITED STATES PATENT AND TRADEMARK OFFICE
CERTIFICATE OF CORRECTION

PATENT NO. : 3,755,353
DATED : August 28, 1973
INVENTOR(S) : Hans Baumann and Andreas Einwiller It is certified that error appears in the above-identified patent and that said Letters Patent are hereby corrected as shown below:

In the heading insert--[30] Foreign Application Priority, July 23, 1970, Germany, P 20 36 504.2--.

Signed and Sealed this

Twenty-first Day of September 1976

[SEAL]

Attest:

RUTH C. MASON
*Attesting Officer*

C. MARSHALL DANN
*Commissioner of Patents and Trademarks*